United States Patent [19]

Hohmann et al.

[11] Patent Number: 4,732,573

[45] Date of Patent: Mar. 22, 1988

[54] NOVEL DYE SALTS OF CATIONIC DYES, HAVING THIOCYANATOMETALLATE OR CYANATOMETALLATE COMPLEX ANIONS FOR SPIN DYEING ACID MODIFIED POLYACRYLONITRILE

[75] Inventors: Kurt Hohmann, Neu-Isenburg; Peter Mischke, Bad Soden am Taunus; Wolfgang Teige, Kelkheim, all of Fed. Rep. of Germany

[73] Assignee: Hoechst Aktiengesellschaft, Frankfurt am Main, Fed. Rep. of Germany

[21] Appl. No.: 945,761

[22] Filed: Dec. 23, 1986

[30] Foreign Application Priority Data

Dec. 28, 1985 [DE] Fed. Rep. of Germany ....... 3546294

[51] Int. Cl.$^4$ .................... C09B 23/10; C09B 69/02; D01F 6/18; D06P 3/76
[52] U.S. Cl. ............................................ 8/654; 8/538; 8/655; 8/927; 524/81; 524/87; 524/94; 524/176; 524/178; 524/179; 524/180; 524/203; 524/210; 534/603
[58] Field of Search .................... 8/654, 655; 524/81, 524/176, 178, 179, 180, 203, 210

[56] References Cited

U.S. PATENT DOCUMENTS

| | | | |
|---|---|---|---|
| 3,271,383 | 9/1966 | Yamaya et al. | 532/608 |
| 3,291,788 | 12/1966 | Yamaya et al. | 534/608 |
| 4,100,131 | 7/1978 | Manier et al. | 524/92 |
| 4,344,879 | 8/1982 | Mohr et al. | 534/751 |
| 4,367,334 | 1/1983 | Loew | 544/103 |
| 4,382,801 | 5/1983 | Loew | 8/538 |
| 4,607,071 | 8/1986 | Hahnke et al. | 524/189 |

FOREIGN PATENT DOCUMENTS

| | | |
|---|---|---|
| 55221 | 6/1982 | European Pat. Off. . |
| 55222 | 6/1982 | European Pat. Off. . |
| 1514263 | 6/1978 | United Kingdom . |

*Primary Examiner*—A. Lionel Clingman

[57] ABSTRACT

Dye salts of a mono- or polycationic dye where the anion conforms to a general formula (1) or (2)

$$[Me(XCN)_4]^{2(-)} \quad (1)$$

$$[Me(SCN)_6]^{n(-)} \quad (2)$$

in which

Me in the formula (1) is the divalent zinc cation, the divalent iron cation, the divalent cobalt cation, the divalent tin cation or the divalent copper cation, and Me in the formula (2) stands for the divalent iron cation, the divalent nickel cation or the trivalent iron cation, X stands for an oxygen or sulfur atom and n depending on the valency of the corresponding metal cation, denotes the number 4 or 3.

The novel dye salts can be obtained for example from aqueous solution or suspension by reacting the corresponding cationic dye which has a customary anion with a metal cation Me donor compound and an alkali metal thiocyanate or cyanate, alkaline earth metal thiocyanate or cyanate or ammonium thiocyanate or cyanate. They are used in particular in the spin-dyeing of acid-modified polyacrylonitrile and copolymers thereof.

12 Claims, No Drawings

NOVEL DYE SALTS OF CATIONIC DYES, HAVING THIOCYANATOMETALLATE OR CYANATOMETALLATE COMPLEX ANIONS FOR SPIN DYEING ACID MODIFIED POLYACRYLONITRILE

The present invention relates to the field of basic dyes. Dyes which have one or more cationic groups and which are to be suitable for the spin-dyeing of acid-modified polyacrylonitrile and acid-modified copolymers of acrylonitrile with other monomers (hereinafter in general referred to as PAC) should for example combine a very high solubility in the organic solvents customarily used in spin-dying processes with very low solubility in water, so that they can be separated from the synthesis batches as quantitatively as possible and free of electrolyte salts; this is because even minor contamination with inorganic salts can cause undesirable blockages in and damage to the spinneret system and consequently necessitate the installation of additional filter devices. Furthermore, these dye salts should be satisfactorily storable, and their solubility must not deteriorate even on prolonged storage. These properties are not only a function of the cation of the dye but also very critically affected by the anion of the dye salt.

The cationic dyes known from the literature for dyeing PAC from an aqueous dyebath do not meet these requirements in the form of their halides, sulfates, methosulfates, phosphates, tetrachlorozincates or acetates, since their high solubility in water usually makes it very difficult to separate them from the synthesis batches free of inorganic companion salts. Furthermore, their solubility in the organic solvents customary for spin-dyeing processes of PAC, such as dimethylformamide, dimethylacetamide, dimethyl sulfoxide, diethyl carbonate and acetone, is frequently too low.

These advantages also apply to the cationic dyes with a nitrate anion, which in U.S. Pat. No. 4,100,131 are used specifically for the spin-dyeing of PAC.

Furthermore, cationic dyes having a tetrafluoroborate anion have been described as specifically suitable for spin-dyeing (see British Pat. No. 1,514,263 and European Patent Application Publication Nos. 0,055,221A, 0,055,222A, 0,055,223A and 0,055,224A). However, these dye salts have the disadvantage that the tetrafluoroborate anion is unstable, which is why the formation of hydrogen fluoride can be observed after storage times of only a few weeks; one consequence is corrosion in the spinning packs. Moreover, the hydrolysis of the tetrafluoroborate anion leads to an increase in the solubility of the dyes in the solvents customary for the spin-dyeing of PAC.

Furthermore, tabulated Example 46 of U.S. Pat. No. 4,607,071 describes a cationic dye for the spin-dyeing of PAC which has a thiocyanate anion. But even dye thiocyanates, on account of their, in some cases, low solubility in the customary solvents, even in acetone, are of only limited utility in spin-dyeing. Moreover, many cationic dyes cannot be precipitated from aqueous solution as crystalline thiocyanate salts or only incompletely.

The abovementioned disadvantages are even more prominent in the case of the basically useful cationic dyes having two quaternary groups, as known for example from U.S. Pat. Nos. 3,271,383, 3,291,788, 4,607,071 and 4,344,879. This is because their very high solubility in water, due to the two cationic centers, makes the salt-free precipitation of biscationic dyes particularly difficult, which is why hitherto yield losses and extensive waste water treatment had to be accepted.

It is therefore the object of the present invention to provide dye salts of cationic dyes which have these disadvantages of hitherto disclosed dye salts only to a minor extent, if at all.

This object is achieved according to the present invention by converting the dyes into dye salts having thiocyanatometallate or cyanatometallate complexes as anions.

The present invention thus provides novel dye salts of mono- or polycationic, such as bis- or triscationic, dyes where the anion conforms to a general formula (1) or (2)

$$[Me(XCN)_4]^{2(-)} \quad (1)$$

$$[Me(SCN)_6]^{n(-)} \quad (2)$$

in which
Me in the formula (1) is the divalent zinc cation, the divalent iron cation, the divalent cobalt cation, the divalent tin cation or the divalent copper cation, and
Me in the formula (2) stands for the divalent iron cation, the divalent nickel cation or the trivalent iron cation,
X stands for a sulfur or oxygen atom and
n depending on the valence of the corresponding metal cation, denotes the number 4 or 3.

Preference is given to the tetracyanatozincate anion.

The novel dye salts according to the invention are, because of their anions of formulae (1) and (2), almost without exception solid, generally crystalline, compounds which, by virtue of that fact, are easily accessible from the synthesis. They can be used with particular advantage as dyes being sparingly water-soluble but readily soluble in the solvents customary for the spin-dyeing of PAC, for the dyeing of PAC by the spin-dyeing technique.

The present invention thus also provides the preparation of these novel dye salts, or, more specifically, the isolating and obtaining of cationic dyes in the pure form by conversion into the dye salts according to the invention. The process comprises reacting, in aqueous solution or suspension, a cationic dye which has a customary anion with a compound which is capable of donating a metal cation Me of the above-defined meaning and with an alkali metal thiocyanate, alkaline earth metal thiocyanate or ammonium thiocyanate or with an alkali metal cyanate, alkaline earth metal cyanate or ammonium cyanate, preferably sodium thiocyanate, potassium thiocyanate, ammonium thiocyanate, sodium cyanate, potassium cyanate or ammonium cyanate, at a temperature between 0° C. and 100° C., preferably 0° C. and 60° C., and at a pH value between 2 and 6, preferably at a pH value of 2.5 to 4.5.

Anions in the starting dye salts are for example the customary anions of inorganic or organic acids or customary metal complex anions of the type present in particular in the synthesis of cationic dyes or in the isolation thereof, for instance the anions evident from the abovementioned references, for example the chloride, sulfate, acetate, methosulfate, nitrate, thiocyanate, cyanate and chlorozincate anions.

Compounds which contain and are able to donate a metal cation Me are in particular the customary salts of these metals with inorganic or organic acids, such as the carbonates, halides, sulfates and acetates of these metals, or even the oxides and hydroxides of these metals. Examples of these metal cation donor compounds are zinc oxide, zinc acetate, zinc sulfate, copper(II) sulfate, iron(II) sulfate, nickel(II) sulfate, cobalt(II) sulfate, iron(III) chloride, iron(III) sulfate, tin(II) chloride, tin(II) sulfae, iron(II) chloride and cobalt(II) sulfate.

The process according to the invention can be carried out particularly advantageously by starting from cationic dyes having a tetrachlorozincate anion and reacting with the alkali metal, alkaline earth metal or ammonium thiocyanate or cyanate within the temperature range mentioned.

In this form of the process it is not necessary to additionally use a metal cation donor compound in the reaction mixture, since the tetrachlorozincate anion of the starting dye salt performs that function. Consequently, this is an elegant way to obtain the dye salt according to the invention directly.

The novel dye salts, owing predominantly to their very low solubility in water, can generally be precipitated from the reaction mixtures in a high yield and, after their isolation, be obtained in almost salt-free form by washing with water, so that expensive process engineering measures for separating inorganic companion salts from the spinning liquids containing the aprotic solvents, can be omitted.

Suitable dye cations are those of mono-, bis- and polycationic dyes; they are numerously described in the literature, for example in the prior art mentioned at the beginning, and can belong to a wide range of chemical dye classes. A special mention may be given to monoazo, disazo and polyazo dyes, methine, polymethine, azamethine and azacyanine dyes, diarylmethane and triarylmethane dyes, anthraquinone dyes, phthalocyanine dyes, azine, oxazine and thiazine dyes, naphthostyryl dyes, acridine, cyanine, dioxazine, benzothiazinophenoxazine, quinophthalone, quinacridone and xanthene dyes.

The cationic groups in the cationic dyes are quaternary ammonium groups, the primary ammonium group itself and protonated ammonium groups having up to two substituents, the substituents being alkyl groups of 1 to 6 carbon atoms, preferably 1 to 4 carbon atoms, which alkyl groups can be substituted, for example by hydroxy, cyano, carbamoyl and phenyl, and where one of these substituents can also be a phenyl radical.

The quaternary groups of the dye cation can be part of the chromophore, for example as substituents on the aromatic portion of the chromophoric system or in the form of cyclammonium structures; the quaternary groups and also the protonated ammonium groups, however, can also be bonded additionally or exclusively via side chains to the chromophoric system. Quaternary groups are for example trialkylammonium groups having lower alkyl radicals, which may be substituted; N,N-dialkyl-N-arylammonium groups having substituted or unsubstituted lower alkyl radicals; N,N-dialkyl-N-aralkylammonium groups having lower, substituted or unsubstituted alkyl groups; and N-monoalkyl-N-aryl-N-aralkylammonium groups having a lower, substituted or unsubstituted alkyl group. These ammonium groups can be bonded to the aromatic portion of the chromophoric system, for example to a benzene or naphthalene nucleus, either directly or via an aliphatic radical which may be bonded to hetero atoms and/or small groups of atoms.

Preferred cationic dyes are those where the cationic charges are part of the chromophore in the form of cyclammonium structures. These cyclammonium radicals which contain quaternary groups are in particular 5- or 6-membered rings which can contain still further hereto aroms, such as oxygen, sulfur and/or nitrogen atoms, which heterocycles can also be bonded directly or fused to aromatic, carbocyclic radicals, such as a benzene nucleus or naphthalene nucleus. The cationic charge on the cyclammonium structures is present in delocalized form, which can be expressed formulawise through various resonance structures.

Cyclammonium radicals and derivatives thereof are preferably pyridinium, pyrazolium, imidazolium, triazolium, tetrazolium, oxazolium, thiazolium, oxodiazolium, thiadiazolium, quinolinium, indazolium, benzimidazolium, benzothiazolium, benzisothiazolium or benzoxazolium structures, which radicals can be preferably substituted in the heterocycles by lower, substituted or unsubstituted alkyl radicals, by aralkyl, aryl and/or cycloalkyl radicals and in the aromatic carbocyclic portions by cationic groups, such as, for example, those mentioned above, or by basic and/or nonionic groups.

Basic groups are for example primary, secondary or tertiary amino groups, hydrazino or amidino groups, and also heterocyclic, nitrogen-containing rings, such as, for example the pyridine, imidazole, morpholine, piperidine or piperazine ring.

Nonionic groups are for example halogen atoms, such as chlorine and bromine atoms, lower, substituted or unsubstituted alkyl groups, lower alkoxy groups, the nitro group, the carbamoyl or sulfamoyl group, a sulfamoyl or carbamoyl group which is substituted by lower alkyl, phenyl and/or benzyl, lower alkanoylamino and lower alkylsulfonyl groups, the cyano and the trifluoromethyl group.

In addition to ammonium groups, which, as already mentioned, can be bonded to the aromatic portion of the chromophoric system either directly or via bridge members, strongly basic groups, can also be present, such as, for example, primary, secondary or tertiary amino groups, hydrazino or amidino groups, which nitrogen-containing groups can also be part of a heterocyclic ring, for example of the pyridine, imidazole, morpholine, piperidine or piperazine ring. Secondary amino groups are preferably lower monoalkylamino groups, phenylamino or aralkylamino groups, for example the methylamino, ethylamino or isopropylamino group, or the phenylamino or benzylamino group. Tertiary amino groups are for example the dimethylamino, diethylamino, N-methylaniline or N-methylbenzylamino group.

The aforementioned hetero atoms and smaller groups of atoms, via which, as bridge members, the amino or ammonium groups can be bonded to the chromophoric system, are for example groups of the formula —O—, —NH—, —N(lower alkyl)—, —CO—, —SO$_2$, —CH$_2$—, —CH$_2$—CH$_2$—, —CH$_2$CH$_2$CH$_2$—, —CH$_2$CH(OH)CH$_2$— and combinations thereof.

If the dyes according to the invention contain two or more quaternary groups, the latter can be identical to or different from each other.

The preceding or following appellations "lower", "aryl" etc. having the following meaning:

The term "lower" denotes that the alkyl or alkylene or alkenyl radical which is present in the group or radical thus designated comprises 1 to 4 carbon atoms; the term "substituted alkyl radical" denotes that the alkyl is substituted by one or two, preferably one, substituent from the group hydroxy, acetoxy, lower alkyloxy, cyano, lower carbalkoxy, chlorine, phenyl and carbamoyl, of which the phenyl can be additionally substituted by halogen, such as chlorine, bromine or fluorine, lower alkyl, lower alkoxy, nitro, acylamino, sulfamoyl and/or carbamoyl and the carbamoyl can be additionally monosubstituted or disubstituted by lower alkyl, a phenyl group or a benzyl radical, the substituted alkyl radical being for example a β-hydroxyethyl, β-cyanoethyl, β-acetoxyethyl, γ-hydroxypropyl, β-methoxyethyl, benzyl or phenylethyl group; the term "aryl" denotes an aryl radical, in particular a phenyl or naphthyl radical, which can be additionally substituted by the abovementioned basic, cationic and/or nonionic groups; nonionic substituents, of which preferably 1 to 3 can be present in the aryl radical, are in particular halogen, such as chlorine or bromine, lower alkyl, such as methyl or ethyl, lower alkoxy, such as methoxy, ethoxy or propoxy, nitro, lower alkylsulfonyl and trifluoromethyl; the term "aralkyl" denotes a lower alkyl radical which is substituted by an aryl radical, the aryl radical having the abovementioned meaning; preferably the aryl radical in "aralkyl" is a phenyl radical which can be substituted by 1 or 2 substituents from the group lower alkyl, lower alkoxy and chlorine; the term "cycloalkyl" denotes a cycloalkyl radical of 4 to 12 carbon atoms, such as the cyclopentyl or cyclohexyl radical, which can in each case be further substituted by 1 to 3 lower alkyl groups, such as methyl groups.

Lower alkyl groups (alkyl radicals) are in particular the methyl and ethyl group, and lower alkoxy groups are in particular the methoxy and ethoxy group. Aralkyl radicals are in particular the benzyl and phenethyl group. Lower, substituted alkyl radicals which are bonded to a nitrogen atom with the alkyl radical are preferably alkyl groups of 1 to 4 carbon atoms which are substituted by a hydroxy, lower alkoxy, cyano or phenyl group, such as, for example, the β-hydroxyethyl, β-cyanoethyl, β-methoxyethyl, the benzyl or phenethyl group.

Quaternary ammonium groups are preferably the trimethylammonium, the triethylammonium, the dimethylethylammonium, the benzyldimethylammonium and the phenyldimethylammonium group.

Of the dye salts according to the invention, it is possible to single out for example those whose dye cations conform to the general formulae (3) to (13):

 (3)

 (4)

 (5)

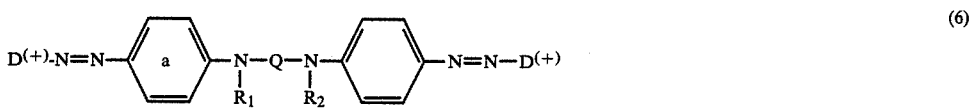 (6)

 (7)

 (8)

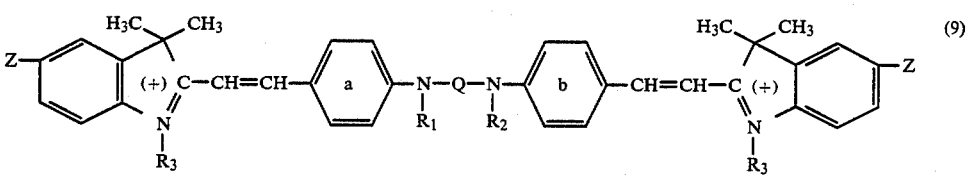 (9)

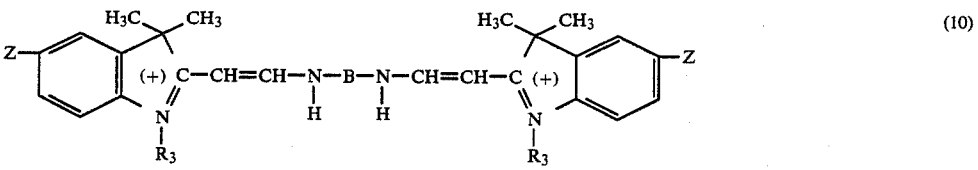 (10)

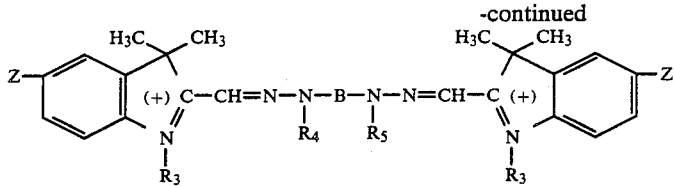 (11)

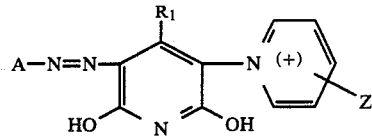 (12)

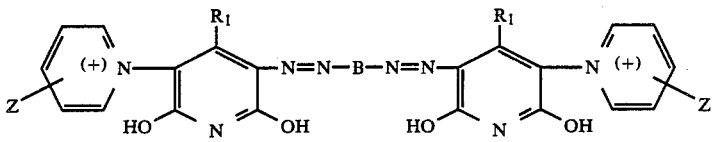 (13)

In these formulae the meanings are:

Alk is a lower alkyl group of which one or two can be substituted by a hydroxy, cyano, carbamoyl or phenyl group;

D(+) is a benzothiazolium radical whose quaternary nitrogen atom contains bonded a lower alkyl group or a benzyl group and whose aromatic carbocyclic radical can be substituted by a methoxy, ethoxy or methyl group or β-trialkylammonioethoxy group having alkyl radicals of 1 to 4 carbon atoms, or is a triazolium, pyrazolium, thiazolium or benzimidazolium radical which is substituted by phenyl, benzyl and/or lower alkyl radicals, or is a phenyl radical which, bonded directly or via a lower alkylene, alkylenoxy, alkylenecarbonyl, alkylenesulfonyl or alkylenesulfonamido group, contains the above-defined ammonium group $-N^{(+)}(Alk)_3$ and can be additionally substituted by chlorine, bromine, methoxy, methyl and/or nitro;

D is a heterocyclic or carbocyclic diazo component, such as in particular a phenyl radical, which can be substituted by 1 or 2 substituents from the group lower alkyl, lower alkoxy, halogen, such as chlorine and bromine, trifluoromethyl, nitro, cyano, lower alkylsulfonyl and arylsulfonyl;

K as the radical of a coupling component, is the radical of aniline or of 1- or 2-aminonaphthalene whose N atom can additionally be monosubstituted or disubstituted by lower, substituted or unsubstituted alkyl radicals or by substituted or unsubstituted aryl radicals, the substituted or unsubstituted alkyl radicals preferably being hydroxy, amino, cyano or phenyl-substituted alkyl radicals and the aryl radicals preferably being the phenyl radical, with the proviso that in the formulae (3) and (5) the ammonium group being bonded to an alkyl or aralkyl radical of K, and it being possible for the aromatic nuclei of the aniline and naphthylamine radical to be substituted by 1 or 2 substituents from the group lower alkyl, lower alkoxy, halogen, such as in particular chlorine, lower alkanoylamino, ureido and phenylureido;

the benzene nucleus a or b or both can be substituted identically to or differently from each other by one or two substituents from the group lower alkyl, lower alkoxy, halogen, such as fluorine, bromine and in particular chlorine, trifluoromethyl and lower alkanoylamino;

Q is a lower alkylene group, such as, for example, the ethylene or propylene group, or a lower alkyleneoxyalkylene group, such as, for example, an ethyleneoxyethylene or a lower alkyleneaminoalkylene group, such as, for example, the diethyleneamino group, which amino group may additionally be substituted by a lower alkyl group which can be substituted by hydroxy, cyano or phenyl, or is an alkylene group of 2 to 8 carbon atoms which is interrupted by 2 amino groups which can be substituted by lower alkyl or hydroxy-; cyano- or phenyl-substituted lower alkyl, or by 2 oxygen atoms, or is an alkylene group of 2 to 8 carbon atoms which is interrupted by a phenylene group;

$R_1$ and $R_2$ are identical to or different from each other and each denotes a hydrogen atom or a lower alkyl group which may be substituted, in particular by a hydroxy, cyano or phenyl group;

A is a benzene nucleus, a naphthalene nucleus or the azobenzene radical which can each be substituted by 1 or 2 substituents from the group lower alkyl, lower alkoxy, chlorine, trifluoromethyl, alkanoylamino, benzoylamino, (lower alkyl)-disubstituted amino, N-(lower alkyl)-N-phenylamino and N-(lower alkyl)-N-benzylamino or by 1 lower ω-dialkoxyaminoalkoxy or 1 lower ω-trialkylammonioalkoxy group, it being possible for the alkyl radicals of these disubstituted amino groups to be additionally substituted by hydroxy, carbonamido or cyano;

$R_3$ is a lower alkyl radical which can be substituted by a hydroxy, lower alkanoylamino, lower alkoxy, cyano or phenyl group;

$R_4$ and $R_5$ are identical to or different from each other and each denotes a hydrogen atom or a lower alkyl group which can be substituted, such as, for ex., by a hydroxy, cyano or phenyl group;

Z denotes a hydrogen atom or a halogen atom, such as a chlorine atom or a lower alkyl group, a lower alkoxy group or a lower carbalkoxy group;

B is a phenylene radical or a radical of the general formula

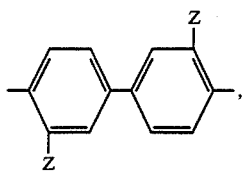

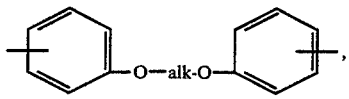

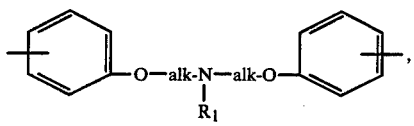

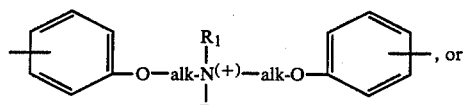

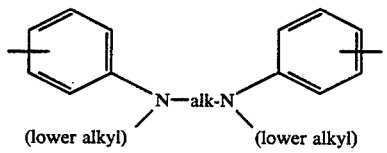

in which
alk denotes a lower alkylene group and
$R_1$, $R_2$ and Z have the abovementioned meanings, or B is a radical of the general formula

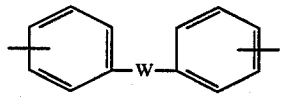

in which W denotes a lower alkylene group, an oxygen atom, the carbonyl, sulfonyl, azo or vinylidene group or a group of the formula —CO—NH— or —NH—CO—NH—.

The dye salts according to the invention are suitable for example for dyeing the PAC in the form of fiber material or in the mass. Surprisingly, they are generally highly soluble in the known solvents used for the spin-dyeing of polymers and copolymers, such as, for example, dimethylformamide, dimethylacetamide, dimethyl sulfoxide, diethyl carbonate and acetone. This is true to a particularly great extent of the dye-tetrathiocyanato-zincate salts according to the invention. It is therefore possible to use these solvents to prepare even at room temperature high-strength dye stock solutions which, depending on the structure of the dye, contain up to 50% by weight of dye, it being possible, by raising the temperature, to increase the solubility. The novel dye salts can be added to the spinning solution containing the polymer dissolved, by means of these stock solutions, or can be added to them directly and dissolved therein. The spinning solution is then homogenized and spun, according to the invention, analogously to a known wet-spinning or dry-spinning process, and the fibers produced be conventionally after-treated.

The present invention thus also provides the use of the dye salts according to the invention in the mass spin-dyeing of PAC, particularly advantageously in spin-dyeing by wet-spinning processes, or, more specifically, a process for spin-dyeing PAC, preferably by the wet-spinning method, wherein a dye salt according to the invention is used as colorant which is soluble in the solvent for PAC, and the spinning solution which contains the dye salt according to the invention is used to prepare spun-dyed PAC filaments by a conventional spin-dyeing method.

The cationic dye salts according to the invention which are soluble in the spinning dope produce completely transparent non-specky spinning solutions which do not cause any mechanical wear on the spinnerets or blockages. The fibers and filaments obtained on spinning, as a consequence of the predominantly molecular dispersion of the dye salts according to the invention, do not show any delustering phenomena of the type which occur when color pigments are used. As a consequence of the absence of dye agglomerates on the fiber surface, which by contrast do occur on spin-dyeing with color pigments, the dyed, spun filaments have an excellent dry and wet crock fastness.

The dye salts according to the invention can be combined freely with one another to give a very wide range of possible colors and shades.

The dye salts according to the invention may be used together with organic or inorganic color pigments, such as, for example, with monoazo, disazo, phthalocyanine, anthraquinone, dioxazine, naphthalenetetracarboxylic acid, perylenetetracarboxylic acid, quinacridone pigments and also fluorescent pigments and also with carbon black, further together with the agents customarily used for delustering polymers, such as, for example, with zinc oxide, zinc sulfide or titanium dioxide, as a result of which it is possible to control the luster of the spun filaments by appropriate addition of delusterants as required.

PAC polymers are known and described in large numbers. Suitable substrates to be spun into filaments are in addition to acrylonitrile polymers copolymers of acrylonitrile with other vinyl compounds, such as, for example, vinyl chloride, vinylidene chloride, vinyl fluoride, vinylidene cyanide, vinyl acetate, vinyl propionate, vinylpyridine, vinylimidazole, vinylpyrrolidone, vinylethanol, acrylic or methacrylic acid, acrylic or methacrylic acid esters, acrylamide or methacrylamide, which copolymers contain at least 50% by weight, preferably at least 85% by weight, of acrylonitrile. The polymers of acrylonitrile or the copolymers thereof are preferably acid-modified; they contain acidic groups which were introduced into the polymer as end groups, for example sulfo or sulfato groups, by means of a catalyst or as comonomers which contain acidic groups, for example styrene-4-sulfonic acid, vinylsulfonic, allylsulfonic or methallylsulfonic acid.

The Examples below serve to illustrate the invention. The parts and percentages are by weight, unless otherwise stated. The visible region absorption maxima ($\lambda_{max}$ values) quoted in the Examples for the dye salts according to the invention were determined in dimethylformamide as solvent.

EXAMPLE 1

A solution at about 60° C. of 169.5 parts of the carbinol base of the formula

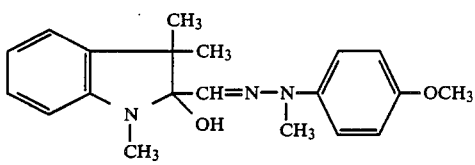

(known from EP-A-No. 0,041,926) in 150 parts of glacial acetic acid and 250 parts of water has added to it 22.4 parts of zinc oxide and is diluted with a further 900 parts of water. The solution obtained is clarified by filtration and added to a solution of 87.5 parts of ammonium thiocyanate in 1700 parts of water, which is followed by 1 to 2 hours of stirring; the coarse precipitate is filtered off with suction, washed with water to remove inorganic salts, and dried at 50° to 60° C.

This gives the dye salt of the formula

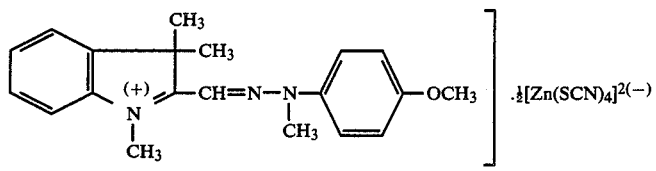

in a yield of 224 parts. It is surprisingly highly soluble in organic solvents, such as dimethylformamide (solubility: 21%), dimethylacetamide (20%) and acetone (10%), and is highly suitable for the spin-dyeing of PAC. The golden yellow filaments obtainable therewith have a very high fastness level. ($\lambda_{max}$=449 nm).

Analysis (calculated with respect to a molecular weight of 470.69 in accordance with the empirical formula $C_{22}H_{24}N_5OS_2Zn_{0.5}$):

| Calculated: | C 56.1% | H 5.1% | N 14.9% | S 13.6% | Zn 6.95%; |
|---|---|---|---|---|---|
| Found: | 56.2% | 5.05% | 14.8% | 13.3% | 7.0%. |

EXAMPLE 2

A warm solution at 50° to 60° C. of 107 parts of the dye of the formula

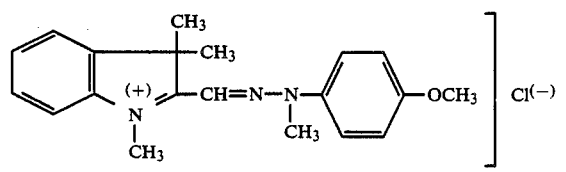

(described as C.I. Basic Yellow 28) in 1500 parts of water and 5 parts of glacial acetic acid is added to a mixture of 200 parts of ice and a solution prepared from 800 parts of water, 158 parts of a 20% strength aqueous zinc acetate solution and 65 parts of potassium cyanate. The batch is heated to 50° C. and is subsequently stirred at that temperature for about a further 90 minutes. The compound, which is precipitated in the form of crystals, is filtered off with suction at 50° C., is washed with water a little at a time and is dried at 50° C. under reduced pressure.

The compound according to the invention of the formula

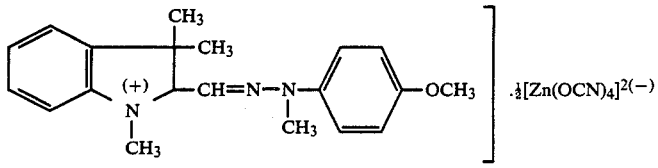

has a solubility in dimethylformamide of about 25%, in dimethylacetamide of about 21% and in acetone of about 6%. Owing to its very good coloristic properties, it is highly suitable for the spin-dyeing of acid-modified polyacrylonitrile ($\lambda_{max}$=449 nm).

Analysis (molecular weight=438.7; $C_{22}H_{24}N_5OS_2Zn_{0.5}$):

| Calculated: | C 60.2% | H 5.0% | N 15.96% | Zn 7.45% |
|---|---|---|---|---|
| Found: | 59.7% | 5.0% | 16.2% | 7.4%. |

EXAMPLE 3

28.7 parts of the azo compound from 3-amino-1,2,4-triazole as diazo component and N-ethyl-N-(β-dimethylaminoethyl)aniline are suspended with 8.4 parts of zinc oxide and 2.4 parts of magnesium oxide in 50 parts of water and are methylated and quaternized at 35° to 45° C. with 66.5 parts of dimethyl sulfate. The batch is stirred for a further 2 hours, and after the batch has been diluted with 125 parts of water excess dimethyl sulfate is hydrolyzed at 70° C. for 2 to 3 hours. The solution of the quaternary azo compound is then clarified, cooled down with ice to 35° to 40° C. and brought with aqueous ammonia solution to a pH value of 3 to 4.5. 31.5 parts of ammonium thiocyanate are added at 35° to 40° C. in the course of 2 hours. The resulting suspension of the dye salt according to the invention is subsequently stirred at about 50° C. for a further 2 to 3 hours, and the compound according to the invention is then filtered off with suction at 35° C., washed with water a little at a time and dried.

This gives the compound according to the invention of the formula

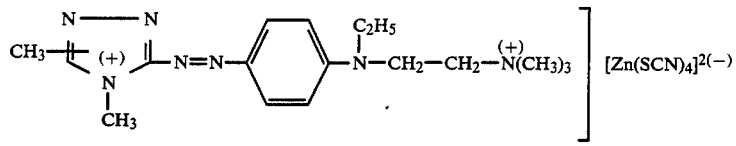

as a dark brown powder. It has a solubility in dimethylformamide of about 24%, in dimethylacetamide of about 22% and in acetone of about 16%. ($\lambda_{max}$=513 nm).

Analysis (molecular weight=628.38; $C_{21}H_{29}N_{11}S_4Zn$):

| Calculated: | C 40.1% | H 4.62% | N 24.5% | S 20.4% | Zn 10.4% |
|---|---|---|---|---|---|
| Found: | 39.75% | 4.6% | 23.8% | 20.6% | 10.3% |

Spin-dyeing of PAC produces lustrous, bright red filaments having excellent fastness properties.

COMPARATIVE EXAMPLE

The solution of the quaternary azo dye with the methosulfate anion is prepared as described above, except for the difference that the basic agent used is not zinc oxide but an equivalent amount of magnesium oxide or sodium bicarbonate, and it is intended to precipitate the quaternary dye obtained from the solution as a thiocyanate salt by adding the corresponding amount of ammonium thiocyanate. In this only some of the dye is obtained in the form of an oily product, which does not even fully crystallize later.

EXAMPLE 4

To synthesize a dye salt according to the invention Example 3 is repeated, except that the ammonium thiocyanate is replaced by 33.7 parts of potassium cyanate. The dye salt, which is initially obtained as an oil, slowly becomes fully crystalline. The crystalline compound obtained of the formula

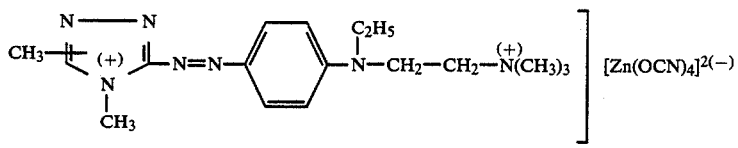

is isolated as described in the previous Examples; it has a solubility in dimethylformamide of about 22% and in dimethylacetamide of about 20%. ($\lambda_{max}$=513 nm).

Analysis (molecular weight=564.38; $C_{21}H_{29}N_{11}O_4Zn$):

| Calculated: | C 44.65% | H 5.1% | N 27.28% | Zn 11.58% |
|---|---|---|---|---|
| Found: | 44.3% | 5.2% | 27.1% | 11.3%. |

EXAMPLE 5

18.45 parts of 2-chloro-4-aminoacetanilide are methylated and quaternized in aqueous suspension at 50° to 60° C. with 50.6 parts of dimethyl sulfate in the presence of 7.6 parts of magnesium oxide; the acetyl group is then hydrolyzed off by reflux for 2 hours with 32% strength hydrochloric acid, in the course of which excess dimethyl sulfate is likewise destroyed. The quaternized diazo component is then conventionally diazotized and coupled to 13.4 parts of N,N'-diethyl-N,N'-diphenyl-1,2-diaminoethane. To this solution of the quaternary disazo compound are then added 46 parts of a 20% strength aqueous zinc acetate solution, followed at 20° to 25° C. and at a pH value of 3 gradually by an aqueous solution of 38 parts of ammonium thiocyanate. This is followed by stirring initially at about 20° C. for one hour and then at 35° to 40° C. for another hour, and isolation of the precipitated course dye salt according to the invention of the formula

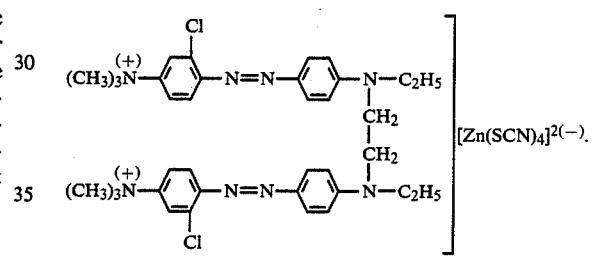

The compound according to the invention has very good properties for the spin-dyeing of PAC and produces therein very fast orange dyeings. Its solubility in dimethylformamide is 26%, in dimethylacetamide about 22% and in acetone about 10%. ($\lambda_{max}$=475 nm).

EXAMPLE 6

Example 5 is followed to prepare the diazonium salt solution of 2-chloro-4-trimethylammoniumaniline, to which is added an aqueous solution of 24.5 parts of N-ethyl-N-($\beta$-trimethylammonioethyl)-aniline chloride. After the coupling reaction has ended the batch is gradually added to a solution of 92 parts of a 20% strength aqueous zinc acetate solution and 38 parts of ammonium thiocyanate in 200 parts of water. The precipitated dye salt according to the invention of the formula

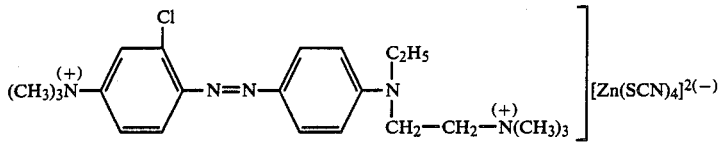

is isolated in a conventional manner as described in the previous Examples. It is very readily soluble in organic solvents, for example dimethylformamide and dimethylacetamide, and in the spin-dyeing of PAC produces filaments having very fast golden yellow shades. ($\lambda_{max}$=443 nm).

EXAMPLE 7

90 parts of the disazo compound of the formula

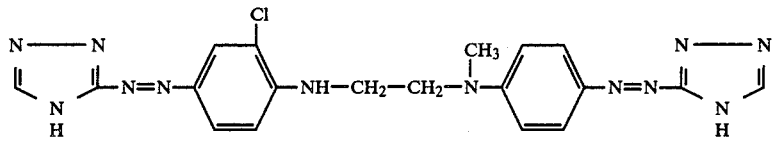

(preparable by coupling diazotized 3-amino-1,2,4-triazole onto N-(2-chlorophenyl)-N'-ethyl-N'-phenyl-1,2-diaminoethane) are methylated and quaternized with 132.4 parts of dimethyl sulfate in the presence of zinc oxide. After hydrolysis of excess dimethyl sulfate the solution is clarified and, at a pH value between 5 and 6 and at a temperature of about 35° C., has gradually added to it an aqueous solution of 62 parts of ammonium thiocyanate; the compound according to the invention crystallizes out. It is isolated in conventional manner. It has the formula and quaternized in conventional manner with 116.5 parts of dimethyl sulfate in the presence of 55 parts of sodium hydrogencarbonate in 200 parts of water; excess dimethyl sulfate is subsequently hydrolyzed at 70° to 75° C. To prepare the compound according to the invention, the solution of this quaternary disazo dye has added to it first zinc sulfate and then an aqueous sodium thiocyanate solution at 35° to 40° C., and is subsequently stirred for some time at 55° to 60° C., and the precipitated compound according to the invention is filtered off with suction at that temperature, is thoroughly and repeatedly washed with water and is dried. It has the formula

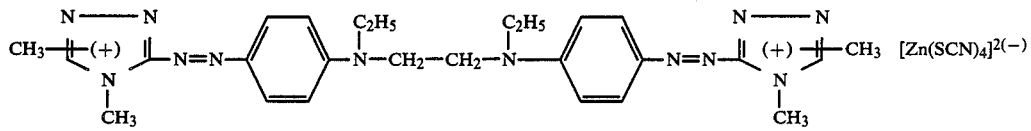

and is distinguished by a very high solubility in dimethylformamide and dimethylacetamide; applied to PAC by spin-dyeing, it produces filaments of a bluish red shade having very good fastness properties. ($\lambda_{max}$=551 nm).

EXAMPLE 9

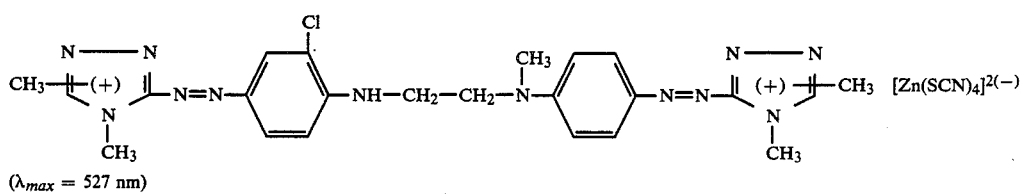

($\lambda_{max}$ = 527 nm)

and a solubility in dimethylformamide of about 23%, in dimethylacetamide of about 20% and in acetone of about 15%. Used in the spin-dyeing of PAC it produces filaments of high luster in a red shade having a very high fastness level.

EXAMPLE 8

55 parts of the disazo compound obtainable by coupling diazotized 3-amino-1,2,4-triazole onto N,N'-diethyl-N,N'-diphenyl-1,2-diaminoethane are methylated 68 parts of the carbinol base of the formula shown in Example 1 are dissolved in dilute aqueous acetic acid, and 28.7 parts of copper(II) sulfate pentahydrate are added. The solution is added with stirring to a solution of 53 parts of potassium cyanate in 1000 parts of water.

The resulting suspension is gradually heated to 50° C. and is subsequently stirred for 1 hour at that temperature. The dye salt according to the invention, which has precipitated in the form of coarse crystals and has the formula

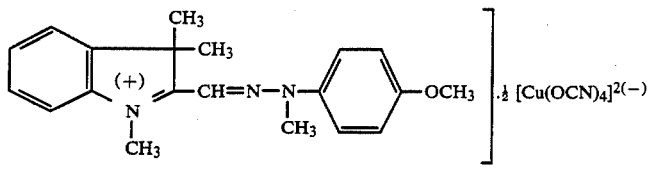

is filtered off with suction, washed with water until free of inorganic companion salts and dried. The compound according to the invention has a solubility in dimethylformamide of about 15% and in dimethylacetamide of about 13% and, applied to PAC by spin-dyeing, produces filaments in reddish yellow shades of a high fastness level. ($\lambda_{max}$=449 nm).

Analysis (molecular weight=437.8; $C_{22}H_{24}N_5O_3\cdot Cu_{0.5}$):

| Calculated: | C 60.3% | H 5.48% | N 16.0% | Cu 7.3% |
|---|---|---|---|---|
| Found: | 59.9% | 5.4% | 16.05% | 7.5% |

EXAMPLE 10

To prepare a dye salt according to the invention, the procedure of Example 9 is followed, except that the copper(II) sulfate is replaced by 18.8 parts of iron(II) sulfate dihydrate and the potassium cyanate by 38 parts of ammonium thiocyanate. The isolated compound according to the invention has the formula

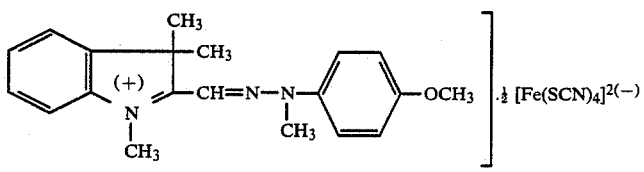

It has a solubility in dimethylformamide of about 15%, in dimethylacetamide of about 13% and in acetone of about 4% and spin-dyes PAC in reddish yellow shades. ($\lambda_{max}$=449 nm).

Analysis (molecular weight=465.9; $C_{22}H_{24}N_5OS_2\cdot Fe_{0.5}$):

| Calculated: | C 56.7% | H 5.15% | N 15.0% | S 13.7% | Fe 5.99% |
|---|---|---|---|---|---|
| Found: | 56.9% | 5.2% | 15.05% | 13.3% | 5.88% |

EXAMPLE 11

28.7 parts of an azo compound from 3-amino-1,2,4-triazole as diazo component and N-ethyl-N-(β-dimethylaminoethyl)aniline as coupling component are methylated and quaternized at 35° to 45° C. with dimethyl sulfate in the presence of magnesium oxide. After the dimethyl sulfate has been added, the batch is stirred at 35° to 45° C. for a futher 2 hours, and excess dimethyl sulfate is then hydrolyzed at 70° C. The batch is then brought to pH 3, and an aqueous solution of 30.3 parts of nickel(II) sulfate hexahydrate is added. At a temperature of about 20° C. an aqueous solution of 53.5 parts of ammonium thiocyanate is added, which is followed by stirring at about 20° C. for about 1 hour and then at 40° to 50° C. for 2 hours, and the precipitated compound according to the invention is filtered off with suction, washed with water and dried.

The compound according to the invention of the formula

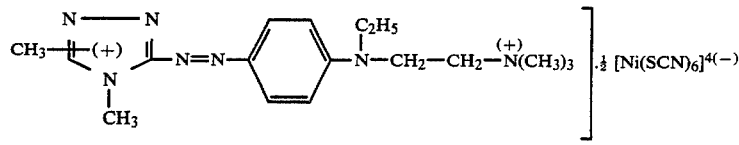

is suitable, owing to the surprisingly high solubility in organic solvents for mass spin-dyeing, for example for the customary wet-spinning dyeing processes, for producing dyed PAC filaments in bright red shades having a high fastness level. ($\lambda_{max}$=513 nm).

Analysis (molecular weight=534.35; $C_{20}H_{29}N_{10}S_3Ni_{0.5}$):

| Calculated: | C 44.9% | H 5.43% | N 26.2% | S 17.97% | Ni 5.49% |
|---|---|---|---|---|---|
| Found: | 44.5% | 5.5% | 25.8% | 17.8% | 5.4% |

EXAMPLE 12

123 parts of the azo compound from 2-amino-6-methoxybenzothiazole as diazo component and N-ethyl-N-(β-hydroxyethyl)-aniline as coupling component are quaternized in water in the presence of 20 parts of sodium hydrogencarbonate at 30° to 45° C. with 84 parts of dimethyl sulfate in conventional manner in the course of about 3 hours. After excess dimethyl sulfate has been hydrolyzed, the batch with the dissolved quaternary compound is slowly stirred into a solution of 158.2 parts of a 20% strength aqueous zinc acetate solution and 78.7 parts of ammonium thiocyanate in 1000 parts of water, to which 800 parts of ice had been added as well. The resulting dye suspension is subsequently stirred at about 10° C. for 1 hour and then at 45° to 50° C. for 2 hours, and the precipitated compound according to the invention is filtered off with suction, washed with water until salt-free and dried. It has the formula

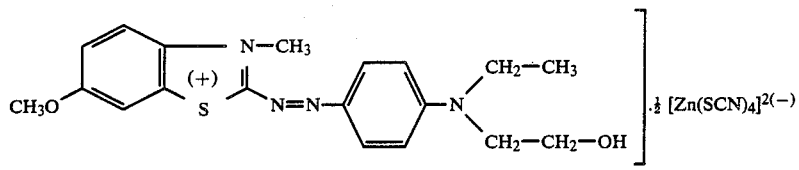

and a solubility in dimethylformamide of about 13%, in dimethylacetamide of about 11% and in acetone of about 6%. In the spin-dyeing of PAC it produces filaments having a bright blue shade with good fastness properties.

Analysis (molecular weight=519.69; $C_{21}H_{23}N_6O_2S_3Zn_{0.5}$):

| | | | | | |
|---|---|---|---|---|---|
| Calculated: | C 48.5% | H 4.43% | N 16.16% | S 18.47% | Zn 6.3% |
| Found: | 48.3% | 4.5% | 16.0% | 18.1% | 16.1%. |

EXAMPLE 12a

To prepare a compound according to the invention, the method of preparation of Example 12 is followed, except that the zinc acetate is replaced by an equivalent amount of copper(II) sulfate, affording the copper tetracyanato salt according to the invention of the dye cation of the formula shown in Example 12. In the spin-dyeing of PAC it produces filaments having bright blue shades with good fastness properties.

EXAMPLE 12b

To prepare a compound according to the invention, the method of preparation of Example 12 is followed, except that the zinc acetate is replaced by an equivalent amount of iron(II) sulfate, affording the iron tetracyanato salt according to the invention of the dye cation of the formula shown in Example 12. In the spin-dyeing of PAC it produces filaments having bright blue shades with good fastness properties.

EXAMPLES 13 TO 89

The tabulated Examples which follow describe further dye salts according to the invention which are capable of dyeing in particular PAC in mass spin-dyeing in the shades indicated in the respective tabulated Example. The extent of their bleeding into the coagulation, drawing and wash baths is very small. These dye salts according to the invention can be prepared in a manner according to the invention from the corresponding quaternary compounds having other anions by reaction with a corresponding metal-donating compound and with a cyanate or thiocyanate salt and be isolated as water-insoluble or very sparingly water-soluble thiocyanatometallate or cyanato-metallate salts which are virtually free of other companion salts.

| Example No. | Dye cation | Anion | Hue |
|---|---|---|---|
| 13 | (structure) | $Zn(SCN)_4^{2\ominus}$ | bluish red |
| 14 | (structure) | $\tfrac{1}{3} Fe(SCN)_6^{3\ominus}$ | reddish yellow |
| 15 | (structure) | $\tfrac{1}{2} Cu(SCN)_4^{2\ominus}$ | reddish yellow (449 nm) |
| 16 | (structure) | $Zn(SCN)_4^{2\ominus}$ | reddish yellow |
| 17 | (structure) | $\tfrac{1}{2} Zn(SCN)_4^{2\ominus}$ | reddish yellow |
| 18 | (structure) | $3/2\ Zn(SCN)_4^{2\ominus}$ | greenish blue |

-continued

| Example No. | Dye cation | Anion | Hue |
|---|---|---|---|
| 19 | | ½ Co(SCN)₄²⊖ | golden yellow |
| 20 | | ½ Zn(SCN)₄²⊖ | blue |
| 21 | | Zn(SCN)₄²⊖ | scarlet |
| 22 | | ½ Zn(SCN)₄²⊖ | greenish yellow |
| 23 | | Zn(SCN)₄²⊖ | yellow |

-continued

| Example No. | Dye cation | Anion | Hue |
|---|---|---|---|
| 24 | | ½ $Zn(SCN)_4^{2\ominus}$ | bright red |
| 25 | | $Zn(SCN)_4^{2\ominus}$ | yellow |
| 26 | | $Zn(SCN)_4^{2\ominus}$ | blue |
| 27 | | $Zn(SCN)_4^{2\ominus}$ | blue |

-continued

| Example No. | Dye cation | Anion | Hue |
|---|---|---|---|
| 28 | (anthraquinone structure with NH–CH(CH₃)₂ and NH–(CH₂)₃–N⁺(CH₃)₂–CH₂–phenyl substituents) | ½ Zn(SCN)₄²⁻ | blue |
| 29 | (bis-benzothiazole azo structure with CH₂NHCOCH₂–N⁺(pyridinium) groups)₂ | Zn(SCN)₄²⁻ | yellow |
| 30 | (dichloroquinone bis-imine structure with biphenyl-N(C₂H₅) and [SO₂NH(CH₂)₃–N⁺(CH₃)₃]₂.₅ substituents) | 1.25 Zn(SCN)₄²⁻ | blue |
| 31 | (naphthol azo structure with OCH₃, OH, and (CH₃)₃N⁺–(CH₂)₃–NH–OC substituents)₂ | Zn(SCN)₄²⁻ | reddish blue |

-continued

| Example No. | Dye cation | Anion | Hue |
|---|---|---|---|
| 32 | (structure with benzothiazole, azo, pyridinium, and methoxyphenyl groups) | ½ Zn(SCN)₄²⁻ | yellow |
| 33 | (structure with guanidine, two phenyl-CH=CH-NH linked to dimethyl-phenyl-N⁺-CH₃ groups, and NH-(CH₂)₂-N(CH₃)₂) | Zn(SCN)₄²⁻ | yellow |
| 34 | (structure with K = triazine bearing three K⊕ substituents, linked via phenyl-CH=CH-NH to dimethyl-phenyl-N⁺-CH₃ group) | 1.5 Zn(SCN)₄²⁻ | yellow |

-continued

| Example No. | Dye cation | Anion | Hue |
|---|---|---|---|
| 35 | | 1,5 Zn(SCN)$_4^{\ominus\ominus}$ | red |
| 36 | | ½ Zn(SCN)$_4^{\ominus\ominus}$ | yellow |
| 37 | | ½ Zn(SCN)$_4^{\ominus\ominus}$ | claret |
| 38 | | ½ Zn(SCN)$_4^{\ominus\ominus}$ | blue |
| 39 | | ½ Zn(SCN)$_4^{\ominus\ominus}$ | scarlet |

-continued

| Example No. | Dye cation | Anion | Hue |
|---|---|---|---|
| 40 | (structure: bis-azo naphthol with pyridinium groups) | $Zn(SCN)_4^{\ominus\ominus}$ | brilliant red |
| 41 | (structure: naphthalene-indanone with trimethylammonium acetamide) | $\tfrac{1}{2} Zn(SCN)_4^{\ominus\ominus}$ | red |
| 42 | (structure: dichloroquinone diimine with trimethylammonium groups) | $Zn(SCN)_4^{\ominus\ominus}$ | blue |
| 43 | (structure: bis-azo naphthol-sulfonic acid with triazine and D groups, D = 3-chloro-4-methylphenyl trimethylammonium) | $Zn(SCN)_4^{\ominus\ominus}$ | red |

-continued
| Example No. | Dye cation | Anion | Hue |
|---|---|---|---|
| 44 | 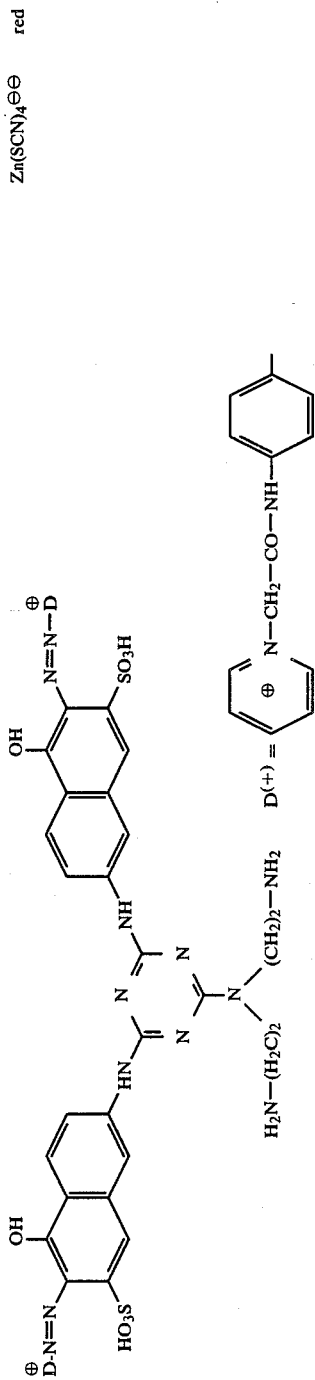 D(+) = 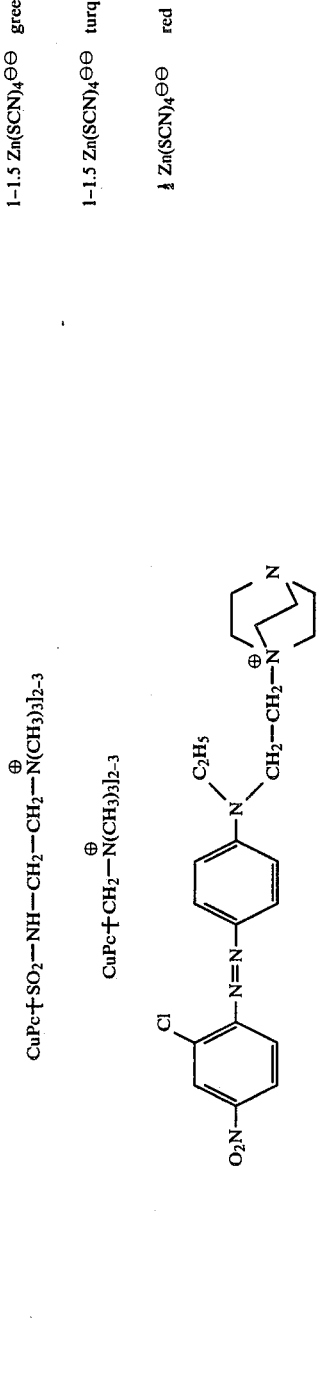 | Zn(SCN)₄²⁻ | red |
| 45 | CuPc†SO₂—NH—CH₂—CH₂—N(CH₃)₃]₂₋₃ | 1–1.5 Zn(SCN)₄²⁻ | greenish blue |
| 46 | CuPc†CH₂—N(CH₃)₃]₂₋₃ | 1–1.5 Zn(SCN)₄²⁻ | turquoise |
| 47 | 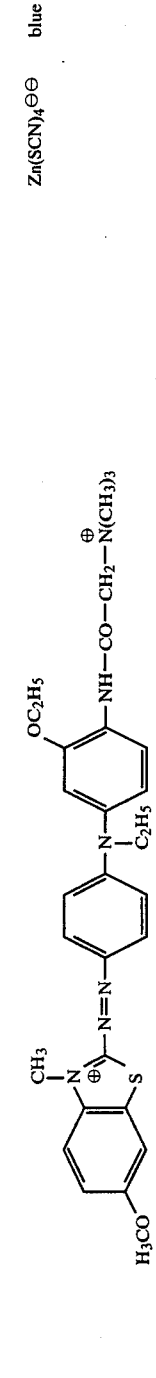 | ½ Zn(SCN)₄²⁻ | red |
| 48 | 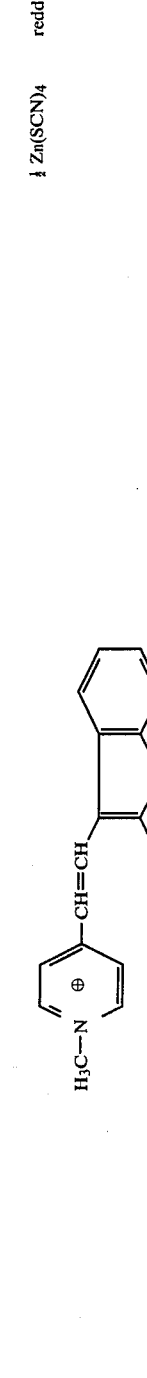 | Zn(SCN)₄²⁻ | blue |
| 49 | 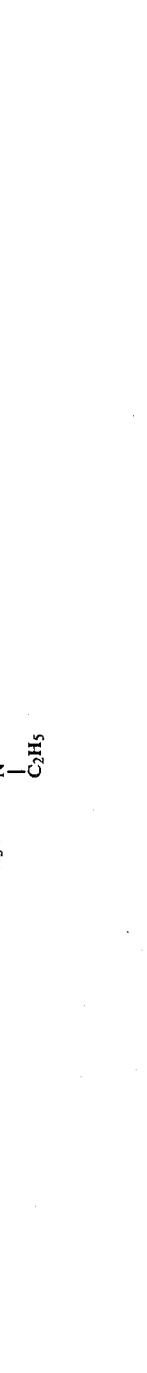 | ½ Zn(SCN)₄ | reddish yellow |

-continued

| Example No. | Dye cation | Anion | Hue |
|---|---|---|---|
| 50 | (structure) | ½–1 Zn(SCN)₄⊖⊖ | red |
| 51 | (structure) | ½–1 Zn(SCN)₄⊖⊖ | orange |
| 52 | (structure) | Zn(SCN)₄⊖⊖ | yellow |
| 53 | (structure) | Zn(SCN)₄⊖⊖ | reddish blue |

-continued
| Example No. | Dye cation | Anion | Hue |
|---|---|---|---|
| 54 |  | Zn(SCN)$_4$$^{\ominus\ominus}$ | yellow |
| 55 | 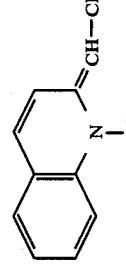 | ½ Zn(SCN)$_4$$^{\ominus\ominus}$ | red |
| 56 | 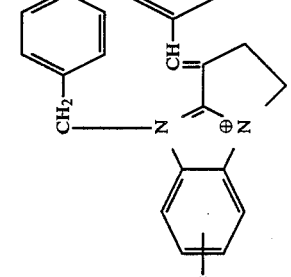 | ½ Zn(SCN)$_4$$^{\ominus\ominus}$ | greenish yellow |
| 57 |  | Zn(SCN)$_4$$^{\ominus\ominus}$ | orange |
| 58 | 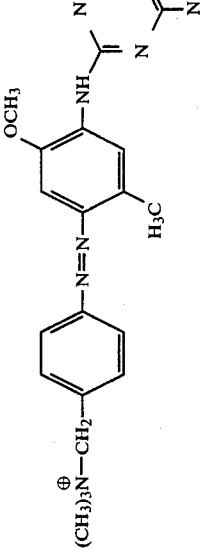 | Zn(SCN)$_4$$^{\ominus\ominus}$ | reddish yellow |

-continued

| Example No. | Dye cation | Anion | Hue |
|---|---|---|---|
| 59 | [CuPc—CH₂—CH₂—N(H)—CH=CH—N⊕(C₂H₅)]₃ | 1.5 Zn(SCN)₄²⁻ | greenish blue |
| 60 | (CH₃)₃N⊕—CH₂—CH₂—CH₂—CH₂—NH—CO—[C₆H₄—N=N—C₆H₃(OCH₃)(CH₃)—NH—CO—C₆H₄—CO—]₂ | Zn(SCN)₄²⁻ | golden yellow |
| 61 | bis-naphthyl carbenium dye with N-C₂H₅ and C₆H₄—NH— bridge | Zn(SCN)₄²⁻ | blue |
| 62 | pyridinium—C₆H₄—N(C₂H₅)(C₂H₄—N⊕(pyridinium))—CH=C(CN)—CO—NH—C₆H₄—]₂—C₆H₄—CH₃ | Zn(SCN)₄²⁻ | yellow |
| 63 | triazine bis[(CH₃)₃N⊕—(CH₂)₃—NH—] with C₆H₄—N=N—CH(CO—CH₃)(CO—NH—C₆H₄—OCH₃) azo group | Zn(SCN)₄²⁻ | yellow |

-continued

| Example No. | Dye cation | Anion | Hue |
|---|---|---|---|
| 64 | | $Zn(SCN)_4^{2\ominus}$ | greenish yellow |
| 65 | | $\tfrac{1}{2} Zn(SCN)_4^{2\ominus}$ | red |
| 66 | | $Zn(SCN)_4^{2\ominus}$ | blue |
| 67 | | $Zn(SCN)_4^{2\ominus}$ | scarlet |
| 68 | | $0.75\, Zn(SCN)_4^{2\ominus}$ | bluish red |

-continued

| Example No. | Dye cation | Anion | Hue |
|---|---|---|---|
| 69 | | Zn(SCN)$_4^{\ominus\ominus}$ | yellowish red |
| 70 | | ½ Zn(SCN)$_4^{\ominus\ominus}$ | red |
| 71 | | ½ Zn(SCN)$_4^{\ominus\ominus}$ | scarlet |
| 72 | | Zn(SCN)$_4^{\ominus\ominus}$ | brownish red |

-continued

| Example No. | Dye cation | Anion | Hue |
|---|---|---|---|
| 73 | (structure) | ½ Zn(SCN)₄²⁻ | yellow |
| 74 | (structure) | Zn(SCN)₄²⁻ | orange |
| 75 | (structure) | ½ Zn(SCN)₄²⁻ | bluish red |
| 76 | (structure) | 2 Zn(SCN)₄²⁻ | yellow |
| 77 | (structure) | Zn(SCN)₄²⁻ | orange |

-continued

| Example No. | Dye cation | Anion | Hue |
|---|---|---|---|
| 78 | (structure) | Zn(SCN)₄²⁻ | bluish violet |
| 79 | (structure) | ½ Zn(SCN)₄²⁻ | red |
| 80 | (structure) | Zn(SCN)₄²⁻ | orange |

-continued

| Example No. | Dye cation | Anion | Hue |
|---|---|---|---|
| 81 | (structure) | Zn(SCN)₄²⁻ | orange |
| 82 | (structure) | ½ Zn(SCN)₄²⁻ | grayish violet |
| 83 | (structure) | ½ Zn(SCN)₄²⁻ | yellow |

-continued

| Example No. | Dye cation | Anion | Hue |
|---|---|---|---|
| 84 | (structure) | 1.5 Zn(SCN)₄⊖⊖ | yellow |
| 85 | (structure) | Zn(SCN)₄⊖⊖ | blue |
| 86 | (structure) | Zn(SCN)₄⊖⊖ | blue |

-continued

| Example No. | Dye cation | Anion | Hue |
|---|---|---|---|
| 87 | (complex azo dye structure with naphthol, sulfonate, and two trimethylammonium groups via NHNHCOCH₂—N(CH₃)₃⁺ on triazine) | 2 Zn(SCN)₄²⁻ | scarlet |
| 88 | (bis-indolinium/azomethine dye structure with triazine-OH linker, ×2) | Zn(SCN)₄²⁻ | yellow |
| 89 | (bis-azo dye with two formamidinium N(CH₃)₂⁺ groups and central chloro-phenyl-NH-CH₂CH₂-N(C₂H₅)- bridge) | [Zn(SCN)₄]²⁻ | red ($\lambda_{max}$ = 527 nm) |

APPLICATION EXAMPLE 1

5 parts of a 5% strength solution of the dye salt according to the invention of Example 3 in dimethylformamide are homogeneously mixed with a 25% strength solution of a polymer of 59% acrylonitrile, 40% vinylidene chloride and 1% sodium methallylsulfonate. The red spinning solution is heated to 50° C. and spun into a coagulation bath composed of 65% by volume of dimethylformamide and 35% by volume of water, drawn in a drawing bath composed of 35% by volume of dimethylformamide and 65% by volume of water at a temperature of 80° C. and subsequently washed in hot water at 90° C. The staining of the coagulation bath is 0.066, that of the drawing bath 0.01 and that of the wash bath 0.006 (in each case optical density). Lustrous brilliant red filaments having excellent fastness properties are obtained.

APPLICATION EXAMPLE 2

100 parts of a 26% strength solution of a polymer of 85% acrylonitrile, 14.5% vinyl acetate and 0.5% sodium methallylsulfonate in dimethylacetamide are homogeneously mixed at 70° to 80° C. with 2 parts of a 10% strength solution of the dye salt according to the invention of Example 7.

This spinning dope is spun through a 100-hole spinneret having a hole diameter of 100 μm into a coagulation bath composed of 70% dimethylacetamide and 30% water, then drawn at 80° C. in a drawing bath composed of 30% dimethylacetamide and 70% water and washed in hot water at 85° to 90° C. The staining of the coagulation bath is 0.06, that of the drawing bath 0.009 and that of the wash bath 0.005 (in each case optical density). Red filaments of high luster which have a very high fastness level are obtained.

We claim:

1. In a process for the spin-dyeing of acid-modified polyacrylonitrile or acid-modified copolymers of acrylonitrile in which a basic dye is used as the colorant, the improvement which comprises employing as the colorant a dye salt of a mono- or polycationic dye where the anion conforms to a formula (1) or (2)

in which

Me in the formula (1) is the divalent zinc cation, the divalent iron cation, the divalent cobalt cation, the divalent tin cation or the divalent copper cation, and Me in the formula (2) stands for the divalent iron cation, the divalent nickel cation or the trivalent iron cation, x stands for an oxygen or sulfur atom and n depending on the valency of the corresponding metal cation, denotes the number 4 or 3.

2. The process as claimed in claim 1, wherein the anion is the tetrathiocyanatozincate anion.

3. The process as claimed in claim 1 in which the dye salt has the formula

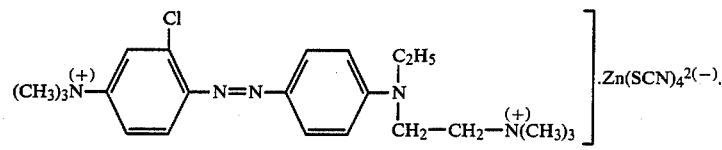

4. The process as claimed in claim 1 in which the dye salt has the formula

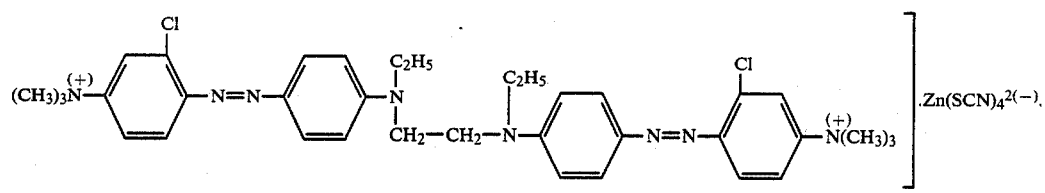

5. The process as claimed in claim 1 in which the dye salt has the formula

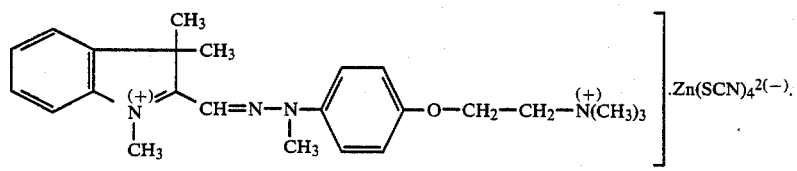

6. The process as claimed in claim 1 in which the dye salt has the formula

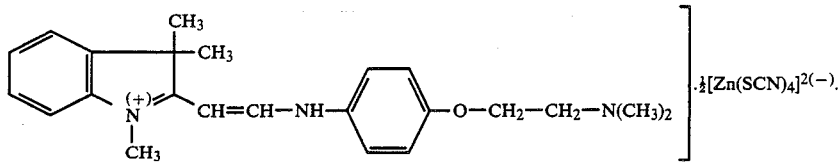

7. The process as claimed in claim 1 in which the dye salt has the formula

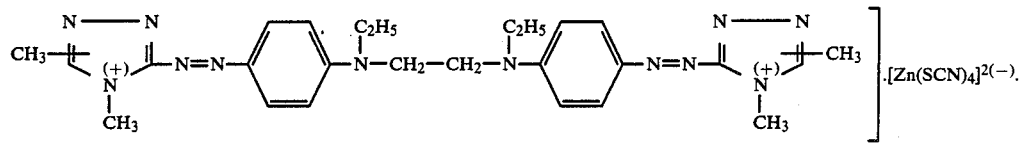

8. The process as claimed in claim 1 in which the dye salt has the formula

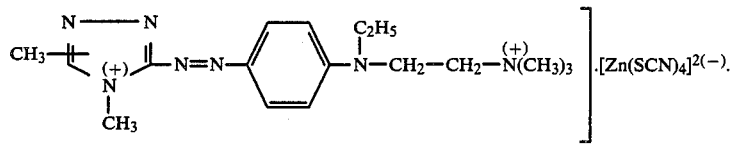

9. The process as claimed in claim 1 in which the dye salt has the formula $$[CuPc]\!\!-\!\!\!\left[SO_2\!-\!NH\!-\!(CH_2)_3\!-\!NH(\overset{(+)}{C}H_3)_2\right]_2 \cdot 3/2[Zn(SCN)_4]^{2(-)}$$

in which CuPc denotes the copper phthalocyanine radical.

10. The process as claimed in claim 1 in which the dye salt has the formula

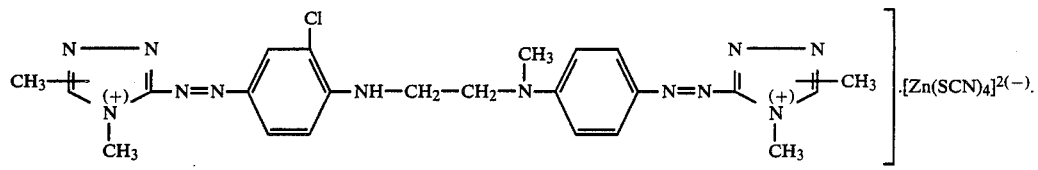

11. The process as claimed in claim 1 in which the dye salt has the formula $$[CuPc]\!\!-\!\!\!\left[CH_2\!-\!\overset{(+)}{N}(CH_3)_3\right]_n \cdot m\ [Zn(SCN)_4]^{2(-)}$$

in which CuPc denotes the copper phthalocyanine radical, n is a number between 2 and 3 and m stands for a number between 1 and 1.5.

12. A process according to claim 1, wherein the spin-dyeing method used is a wet-spin dyeing procedure.

* * * * *